(12) United States Patent
Desaute et al.

(10) Patent No.: US 6,600,161 B2
(45) Date of Patent: Jul. 29, 2003

(54) METHOD AND APPARATUS FOR IMAGING BY MEANS OF IONIZING RADIATION

(75) Inventors: Pascal Desaute, Paris (FR); Serge Maitrejean, Paris (FR)

(73) Assignee: Biospace Instruments, Paris (FR)

( * ) Notice: Subject to any disclaimer, the term of this patent is extended or adjusted under 35 U.S.C. 154(b) by 51 days.

(21) Appl. No.: 10/037,837

(22) Filed: Jan. 2, 2002

(65) Prior Publication Data

US 2003/0122084 A1 Jul. 3, 2003

(51) Int. Cl.[7] .................................................. G01T 1/16
(52) U.S. Cl. ........................................ 250/395; 250/369
(58) Field of Search ................................. 250/395, 369, 250/374, 375, 385.1

(56) References Cited

U.S. PATENT DOCUMENTS

| | | |
|---|---|---|
| 4,092,539 A | 5/1978 | Pao et al. |
| 4,893,015 A | 1/1990 | Kubierschky et al. |
| 5,959,302 A | 9/1999 | Charpak |
| 6,133,575 A | 10/2000 | Charpak et al. |
| 6,476,397 B1 * | 11/2002 | Francke ............... 250/385.1 |

FOREIGN PATENT DOCUMENTS

| | | |
|---|---|---|
| EP | 0 845 687 | 6/1998 |
| FR | 2 739 941 | 10/1995 |
| FR | 2 749 402 | 5/1996 |
| FR | 2 754 068 | 10/1996 |

* cited by examiner

*Primary Examiner*—Diego Gutierrez
*Assistant Examiner*—Tania C. Courson
(74) *Attorney, Agent, or Firm*—Marshall, Gerstein & Borun

(57) ABSTRACT

A method of imaging by means of ionizing radiation in which a first measurement f1 is performed by integrating a detection signal generated by each detection cell of an ionizing radiation detector while simultaneously making a second measurement f2 by counting ionizing rays, and then an estimate of the flux is calculated, in particular by using the formula $$f = \alpha \cdot f1 + (1-\alpha) \cdot f2$$

where $\alpha$ is an increasing function over the range 0 to 1 of a first estimate fe of the flux f, which first estimate is established as a function of at least one of the first and second measurements f1 and f2.

9 Claims, 3 Drawing Sheets

METHOD AND APPARATUS FOR IMAGING BY MEANS OF IONIZING RADIATION

FIELD OF THE INVENTION

The present invention relates to methods and apparatuses for imaging by ionizing radiation, in particular in applications to medical imaging or to non-destructive inspection, and in particular using X-rays, or possibly β or γ rays (radiography, tomography, scanning, etc.).

More particularly, the invention relates to a method of imaging by ionizing radiation comprising the following steps:

causing a detection signal S(t) to be generated by at least one detection cell (E1–En), said detection signal comprising a succession of individual detection signals s(t) generated by the detection cell each time said detection cell detects an ionizing ray coming from a certain observation zone and having energy lying in a predetermined range of energy values; and processing the detection signal S(t) to obtain at least one measurement of the ionizing radiation flux detected by the detection cell during a measurement period T so as to generate an image of the observation zone, said image comprising at least one point given an intensity value which is a function of at least said ionizing radiation flux as measured by the detection cell during the detection period.

BACKGROUND OF THE INVENTION

A method of that type is disclosed in document EP-A-0 845 687, for example.

It should be observed that the above-mentioned image, can:

be reduced to a point, in which case it constitutes a single measurement of the ionizing radiation flux; or comprise a large number of points in two (or possibly three) dimensions, in which case it can give a visual representation of the zone under observation.

It should also be observed that the above-mentioned intensity value which in radiography or tomography generally gives an indication concerning the density of the tissue through which the ionizing radiation has passed, can either be a function of a single measurement of the ionizing radiation flux, or can be the result of combining a plurality of measurements (particularly when the method of the invention is applied to a scanner).

In known methods of the above type, the processing of the detection signal generally includes integration over a measurement time T, giving an integrated signal value which is proportional to the number of detections and thus to the ionizing radiation flux detected during the measurement period.

That method of measurement gives satisfaction at high levels of ionizing radiation flux. However, at low flux levels (e.g. fewer than 1 million counts per second), that method gives results that are less good because of the relative increase in noise level.

Furthermore, methods are also known of imaging by means of ionizing radiation in which the detection signal is not integrated, but in which individual detection signals generated by the detection cell are counted, thus making it possible to count directly the number of ionizing rays that have interacted with said detection cell. Such a method is disclosed, for example, by Babichev et al. (Digital radiographic installation for medical diagnostics, Institute of Nuclear Physics, Novosibirsk, 1989).

Such direct count imaging methods give good results at low levels of ionizing radiation flux, but poor results at high flux levels (e.g. greater than a few million counts per second), i.e. once the individual detection cell begins to detect ionizing rays so close together that it can no longer discriminate between two successive individual signals.

Thus, at present, there does not exist any method of imaging by ionizing radiation flux which gives results that are equally good both at low flux levels and at high flux levels of the ionizing rays.

OBJECTS AND SUMMARY OF THE INVENTION

An object of the present invention is thus to propose a method of imaging by ionizing radiation which makes it possible to obtain a reliable measurement of the ionizing radiation flux with a maximum signal/noise ratio over a very large range of flux levels.

To this end, according to the invention, in a method of the kind in question, during each measurement period, two measurements are performed simultaneously on the ionizing radiation flux detected by a given detection cell, specifically:

a first measurement f1 proportional to the integral of the detection signal S(t) generated by the detection cell during the measurement period T; and a second measurement f2 proportional to the number of successive detection signals s(t) during the same measurement period T;

and the intensity value for each image point is a predetermined function of at least one pair of first and second measurements f1, f2 corresponding to said point, said predetermined function giving increasing weight to the first measurement f1 compared with the second measurement f2 with increasing value for a first estimate fe of the ionizing radiation flux, which first estimate is a function of at least one of the first and second measurements f1 and f2 (the predetermined function in question can be represented in particular by a mathematical formula or by a chart).

By means of these dispositions, a reliable measurement is obtained of ionizing radiation flux over a wide range of flux values (e.g. zero to 10 million counts per second). Furthermore, the reliability of this measurement, and in particular its high signal-to-noise ratio makes it possible to reduce the incident doses of ionizing radiation, which is of very great important for medical applications in particular. It can thus be expected that the doses delivered to patients for tomography can be divided by 2 or 3.

In preferred embodiments of the method of the invention, use can optionally also be made of one or more of the following dispositions:

the intensity value is a function solely of the ionizing radiation flux measurements corresponding to a given point of the observation zone;

the intensity value of said image point is a function of a flux value f of the ionizing radiation as determined by the following formula:

$$f = \lambda \cdot [\alpha \cdot f1 + (1-\alpha) \cdot f2]$$

where λ is a predetermined constant coefficient and α lies in the range 0 to 1, being an increasing function of said first estimate of the flux f (which function is optionally continuous, possibly includes horizontal portions, and need not actually reach the values 0 and 1 themselves);

α is a continuous function of fe;

α is a Boltzman sigmoid having the following formula:

$$\alpha = 1 - 1/[1+\exp([fe-f0]/\Delta f)]$$

where f0 and Δf are two predetermined values referred to respectively as the transition value and as the transition width;

fe is equal to f1 (at low flux levels, the difference between f and f1 is less than the difference between f and f2 at high flux levels, thus obtaining a relatively reliable first estimate of the flux f);

the image comprises a plurality of points each given an intensity value which is a function of a plurality of pairs of ionizing radiation flux measurements corresponding respectively to a plurality of adjacent points in the observation zone; and the intensity value of each image point is a function:

firstly of ionizing radiation flux measurements corresponding to a given point of the observation zone; and secondly of first and second gradient values corresponding respectively to the first and the second measurements in the vicinity of the said point of the observation zone.

Furthermore, the invention also provides apparatus for imaging by means of ionizing radiation, the apparatus comprising:

at least one detection cell adapted to interact with ionizing radiation having energy lying within a predetermined range of energy values to generate a detection signal S(t) comprising a succession of individual detection signals s(t), the detection cell being adapted to generate an individual detection signal s(t) each time said detection cell detects an ionizing ray coming from a certain observation zone and having energy lying in a predetermined range of energy values; and processor means adapted to process the detection signal S(t) to obtain at least one ionizing radiation flux measurement detected by a given detection cell during a measurement period T so as to generate an image of the observation zone, said image comprising at least one point that is given a certain intensity value which is a function of at least said ionizing radiation flux as measured by the detection cell during the detection period, wherein the processor means comprise measuring means for making two measurements simultaneously of the ionizing radiation flux during each measurement period, namely:

a first measurement f1 proportional to the integral of the detection signal S(t) generated by the detection cell during the measurement period T; and a second measurement f2 proportional to the number of successive detection signals s(t) generated by the detection cell during the measurement period T, and wherein said processor means further comprise computer means for determining the intensity value of each point of the image as a predetermined function of at least one pair of first and second measurements f1 and f2 corresponding to said point, said predetermined function giving increasing weight to the first measurement f1 compared with the second measurement f2 when a first estimate fe of the ionizing radiation flux increases, which first estimate is a function of at least one of the first and second measurements f1 and f2.

BRIEF DESCRIPTION OF THE DRAWINGS

Other characteristics and advantages of the invention appear from the following description of an embodiment, given by way of non-limiting example and with reference to the accompanying drawings.

In the drawings.

MORE DETAILED DESCRIPTION

In the various figures, the same references are used to designate elements that are identical or similar.

Figure 1:
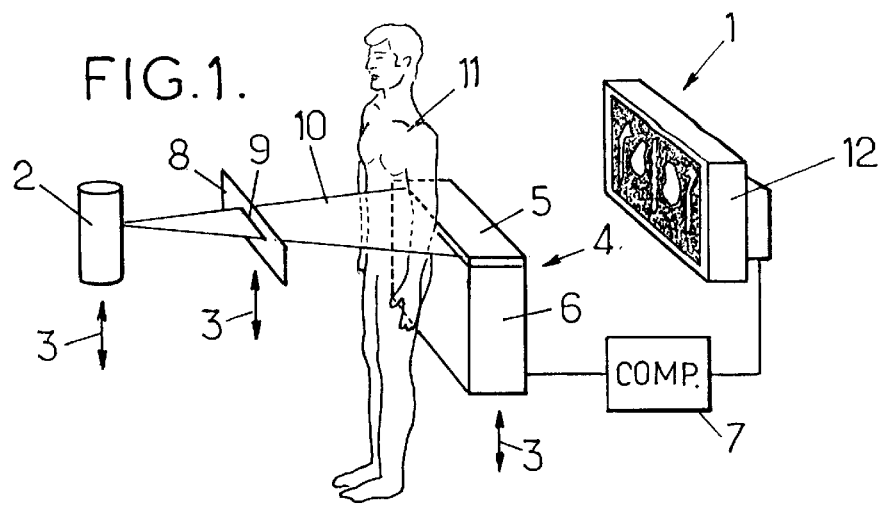
FIG. 1 is a diagram representing radiographic imaging apparatus constituting a first embodiment of the invention.

FIG. 1 is highly diagrammatic and represents medical imaging apparatus 1, and specifically scanning X-ray apparatus.

The imaging apparatus 1 comprises a source 2 of ionizing radiation, specifically X-rays, which source is movable in a direction 3, and apparatus 4 for measuring the ionizing radiation flux.

This measuring apparatus 4 comprises:

a detector 5 that moves together with the source 2 in the direction 3, which detector can be a gas detector such as one of those described in the following documents: FR-A-2 749 402, FR-A-2 754 068, and FR-A-2 739 941, or a solid state detector of the kind described in document EP-A-0 845 687; with the detector 5 comprising a series of detection cells in a row perpendicular to the direction 3 in the present example (the detection cells could optionally be disposed in two dimensions, occupying a plane facing the source 2);

a processor 6 which can be secured to the detector 5 and which generates two measurements f1 and f2 of the ionizing radiation flux for each detection cell making up the detector 5, the measurements being generated respectively by integration and by counting; and a computer 7 (COMP.) which communicates with the processor 6 and which is programmed to compute a reliable estimate of the flux f for each detection cell, in the manner explained below (in a variant, this estimate could be computed by a respective circuit specific to each detection cell).

Furthermore, the imaging apparatus 1 also comprises a collimator 8 which is movable together with the source 2 in the direction 3 and which is interposed between the source 2 and the detector 5, the collimator comprising lead or the like for the purpose of stopping X-rays except through a thin slot 9 of said collimator which allows a beam 10 of ionizing radiation lying in a plane to pass through on its way towards the measuring apparatus 4.

Finally, the computer 7 is programmed in conventional manner to generate an image of a patient 11 or of some other object interposed between the collimator 8 and the detector 5, as a function of the ionizing radiation flux measurements performed by each of the detection cells. This image is then presented on a screen 12 connected to the computer.

Figure 2:
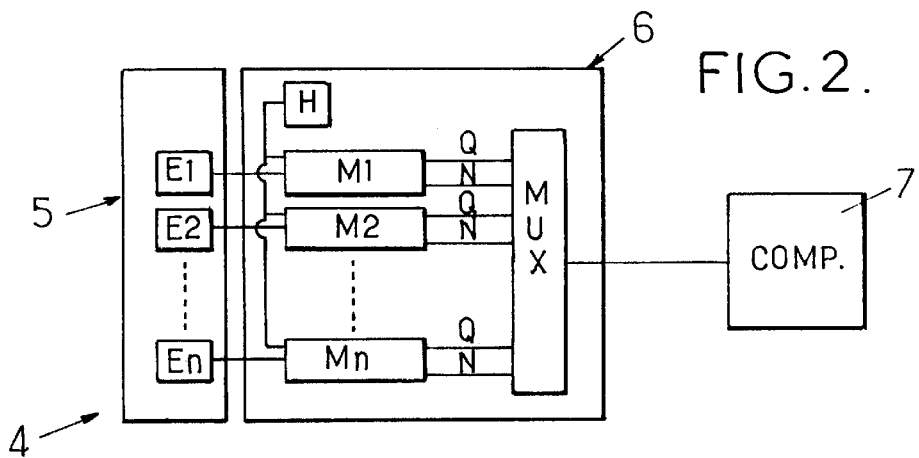
FIG. 2 is a block diagram showing the circuit for measuring ionizing radiation flux in the imaging apparatus of FIG. 1.

As shown in FIG. 2, the processor 6 comprises:

a clock H which determines the beginning of the measurement period T during which one row of the radiographic image is generated in the present example;

measurement circuits M1, M2, . . . , Mi, . . . , Mn which are constituted in this example by n electrodes E1, E2, . . . , Ei, . . . , En (as applies in particular for gas detectors), constituting the detection cells and each delivering a short detection signal s(t) in the form of an electric current each time they detect an X-ray, with the stream of individual detection signals delivered by each detection cell during the detection period T forming the detection signal S(t) generated by said detection cell, and with each of the measurement circuits delivering two logic output signals corresponding to the above-mentioned first and second measurements f1 and f2 for the corresponding detection cell; and a multiplexer MUX or some other interface connected to the computer 7 to enable it to read the measurements Q, N from each detection cell.

Figure 3:
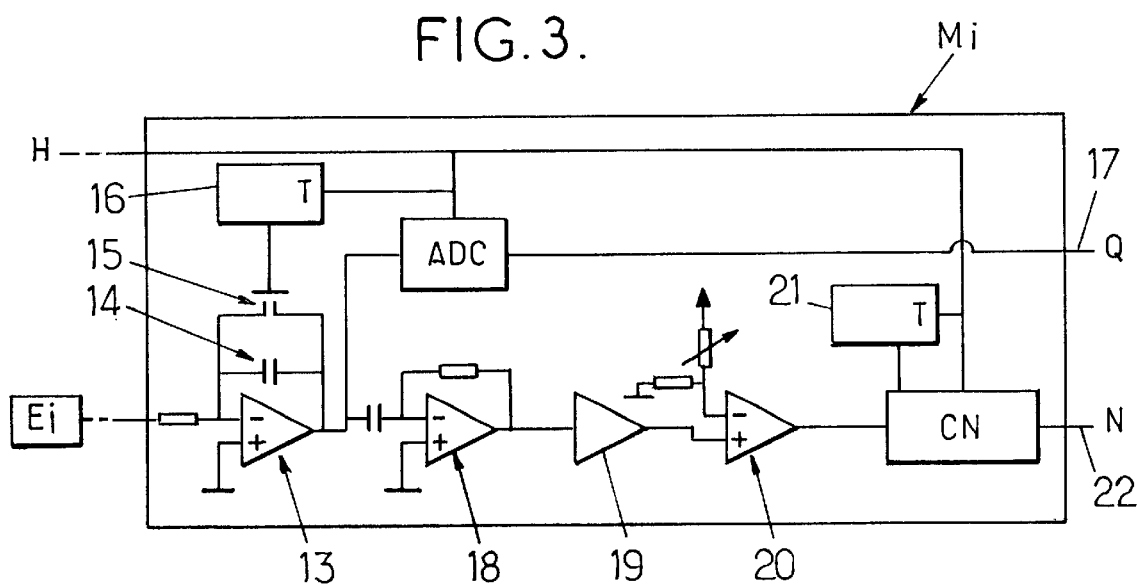
FIG. 3 is a block diagram showing the measurement circuit corresponding to one of the detection cells of the FIG. 2 circuit.

As can be seen in FIG. 3, each measurement circuit Mi can comprise the following for example:

an integrator 13 whose input is connected to the corresponding detection cell Ei, this integrator including a capacitor 14 for accumulating an electric charge Q corresponding to the integral of the signal S(t) during the measurement period T;

an analog-to-digital converter ADC for reading the charge Q, the analog-to-digital converter being controlled by the clock signal H;

an electronic switch 15 which is controlled by the clock signal H via a timing circuit 16 that generates a time delay τ, so as to clear the capacitor 14 at the end of each measurement period;

an output 17 connected to the analog-to-digital converter ADC to communicate with the computer 7 via the interface MUX;

a differentiator 18 connected to the output of the integrator 13.

a pulse shaper 19 connected to the output of the differential 18;

a comparator 20 connected to the output of the shaper 19;

a counter CN connected to the output of the comparator 20 to count the number of individual detection signals generated by the detection cell Ei (and thus the number of X-rays detected by said cell) during each measurement period T, the counter CN being started by the clock signal H and being stopped by an output from a timing circuit 21 that delivers a time delay τ; and an output 22 connected to the interface MUX for communicating the number N of detections to the computer.

On the basis of the above data, the computer 7 calculates the measurement f of the ionizing radiation flux detected by each detection cell E1–En using the following formula:

$$f = \lambda \cdot [\alpha \cdot f1 + (1-\alpha) \cdot f2]$$

where:

λ is a predetermined coefficient, e.g. equal to 1;

f1=Q/(q·T), where q is a predetermined mean value (e.g. determined during an operation of calibrating the detector) representing the integral of the individual detection signal s(t) as generated by each detection cell each time it detects an X-ray;

f2=N/T; and

α is an increasing function, preferably a continuous function in the range 0 to 1, of a first estimate fe of the flux f, which first estimate is established as a function of at least one of the first and second measurements Q and N (in practice, it is assumed fe=f1).

Figure 4:
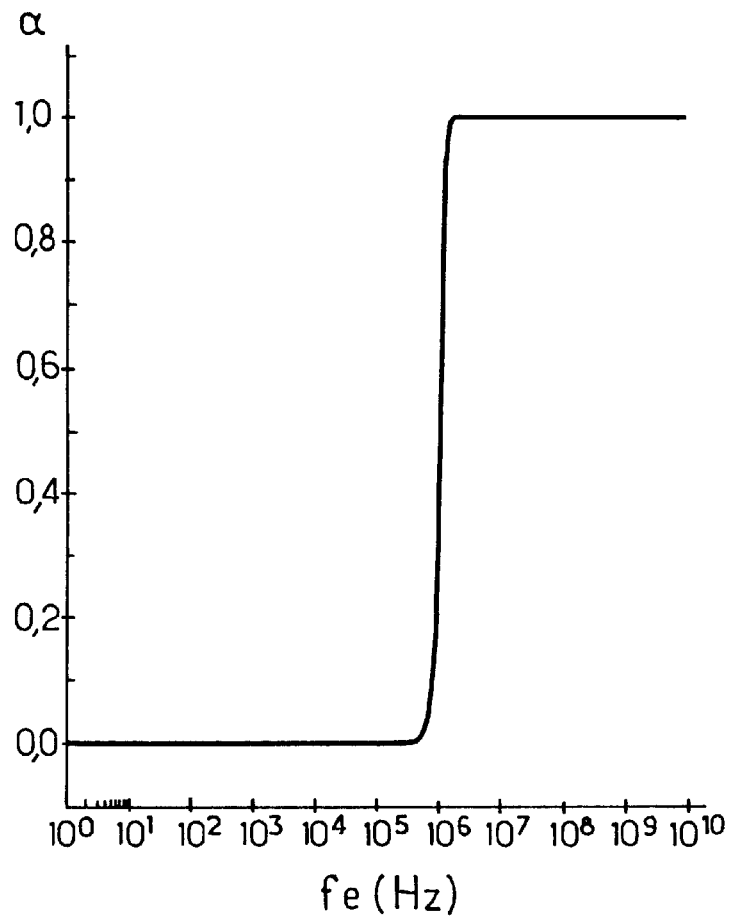
FIG. 4 is a graph giving an example of the combining function a used for combining two measurements generated by the FIG. 3 measurement circuit.

The function α(fe) can advantageously be a Boltzman sigmoid (shown in the graph of FIG. 4), having the following formula:

$$\alpha = 1 - 1/[1+\exp([fe-f0]/\Delta f)]$$

where f0 and Δf are two predetermined values referred to respectively as the transition value and as the transition width, and in the example of FIG. 4 they are equal respectively to 1 MHz (i.e. 1 million counts per second) and to 0.1 MHz.

Figure 5:
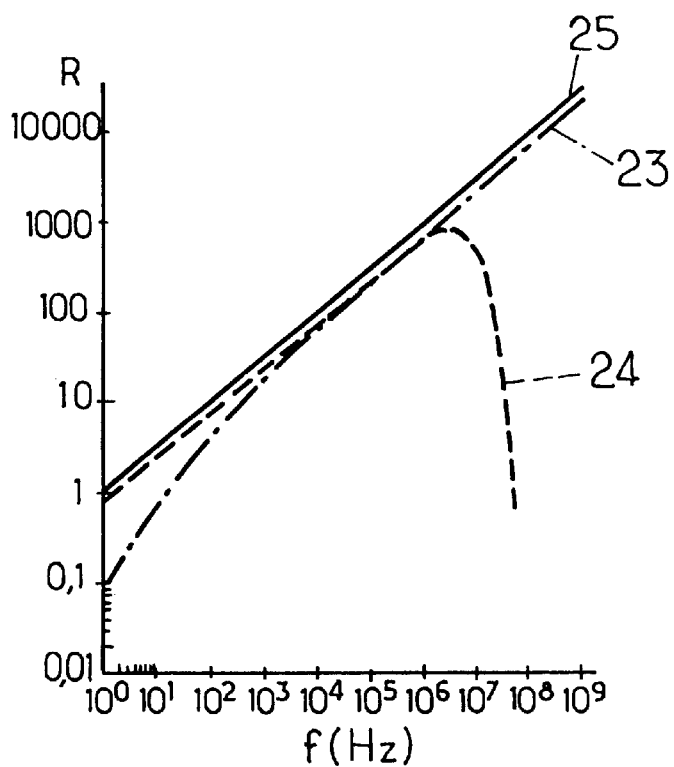
FIG. 5 is a graph giving the signal-to-noise ratio of the two measurements generated by the FIG. 3 circuit and the measured ionizing radiation flux that results from combining these two measurements.

This ensures that an excellent signal-to-noise ratio is obtained for the measurement f over a very wide measuring range extending, for example, from 0 to 10 MHz, as represented by curve 25 in FIG. 5, to be compared with the signal-to-noise ratio of f1 (curve 23) and of f2 (curve 24).

The various measurements f from each detection cell are stored by the computer 7 for the various successive detection periods T as all or part of the patient 11 is scanned by the beam 10 of X-rays, after which the radiological image of the patient is displayed on the screen 12 and/or is printed out, possibly after performing conventional imaging treatments. Each of the various points of the image corresponds to a pair of measurements, one obtained by counting and the other by integration and both performed by the same detection cell, each image point being given an intensity value which is proportional to the above-mentioned value for f and which can be represented, for example, by various levels of gray.

In a variant, it is possible to provide a first image solely on the basis of measurements obtained by integration and a second image solely on the basis of measurements obtained by counting, and then to combine these two images by some more complex method such that each point in the final image stems not only on the two measurements of ionizing radiation flux performed at the point, but also on measurements performed at neighboring points.

The value f at each point can be a function F:

of the measurements f1 and f2 performed simultaneously at that point; and of the respective gradients of said measurements (in fact the moduluses of the gradients) at said point, thus taking account of points adjacent to the point in question.

The function F can be determined empirically, once and for ever for each type of imaging apparatus, on the basis of a large number of experimental measurements made on objects of different known materials and of different known shapes, and in particular on objects that are wedge-shaped.

On the basis of such measurements, the function F is optimized so that the ratio grad(f)/var(f) is a maximum.

The function F as determined in this way could in particular be of the following type:

$$f(x,y) = F(f1(x,y), f2(x,y), \text{grad} f1(x,y), \text{grad} f2(x,y))$$

for example:

$$f(x,y)=\alpha(f1(x,y),f2(x,y),\text{grad}f1(x,y),\text{grad}f2(x,y))\cdot f1(x,y)+[1-\alpha(f1(x,y),f2(x,y),\text{grad}f1(x,y),\text{grad}f2(x,y))]\cdot f2(x,y),$$

where x,y are the coordinates of each image point and α is a function which is determined for instance empirically for maximizing the ratio grad(f)/var(f).

Figure 6:
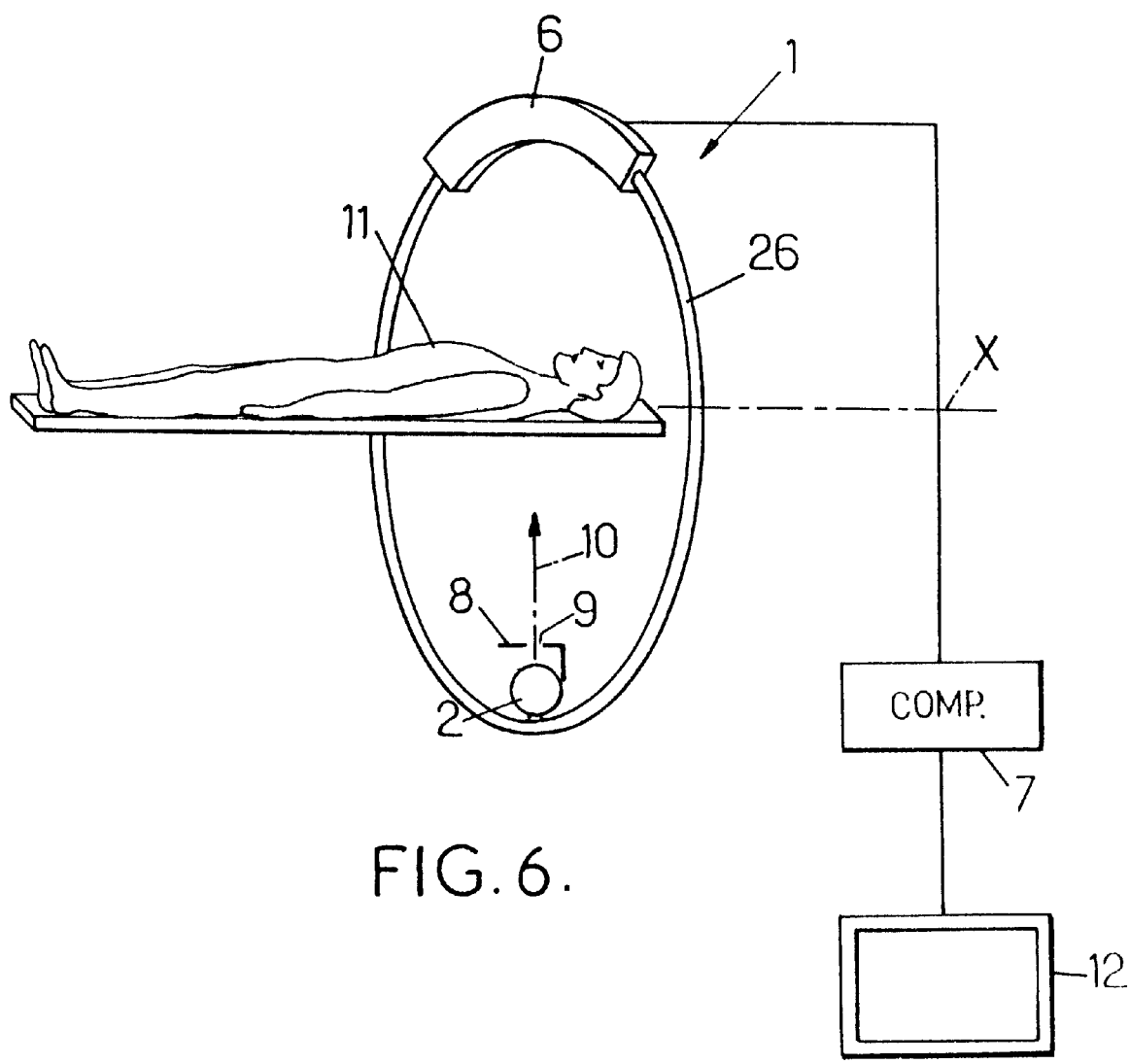
FIG. 6 is a diagrammatic view of tomography apparatus constituting a second embodiment of the invention.

The invention is also applicable to a scanner, for example of the kind shown highly diagrammatically in FIG. 6. Under such circumstances, the radioactive source 2 and/or at least a portion of the processor 6 can be carried by a support 26 that turns around an axis X, e.g. a horizontal axis, and the patient 11 can also be moved horizontally along the axis X so as to make successive "section" views of the patient.

To make each of these "section" views, the processor 6 sends pairs of ionizing apparatus flux measurements to the computer 7, which pairs are obtained as the support 26 performs successive rotations, with the measurements in each pair being obtained respectively by integration and by counting.

These pairs of measurements can be used directly to obtain a single value for the ionizing radiation flux per cell as described above, and then the successive measurements from the various cells are combined in conventional manner to obtain said section view (where the various cells correspond to views of the zone of the patient under observation as seen under a plurality of different successive angles).

In a variant, for each section view, it is also possible to make a first image solely on the basis of the measurements obtained by integration and a second image solely on the basis of the measurements obtained by counting, and then to combine the two images as described above for the embodiment described with reference to FIG. 1.

What is claimed is:

1. A method of imaging by ionizing apparatus, the method comprising the following steps:

causing a detection signal S(t) to be generated by at least one detection cell, said detection signal comprising a succession of individual detection signals s(t) generated by the detection cell each time said detection cell detects an ionizing ray coming from a certain observation zone and having energy lying in a predetermined range of energy values; and processing the detection signal S(t) to obtain at least one measurement of the ionizing radiation flux detected by the detection cell during a measurement period T so as to generate an image of the observation zone, said image comprising at least one point given an intensity value which is a function of at least said ionizing radiation flux as measured by the detection cell during the detection period;

wherein, during each measurement period, two measurements are performed simultaneously on the ionizing radiation flux detected by a given detection cell, specifically:

a first measurement f1 proportional to the integral of the detection signal S(t) generated by the detection cell during the measurement period T; and a second measurement f2 proportional to the number of successive detection signals s(t) during the same measurement period T;

and wherein the intensity value for each image point is a predetermined function of at least one pair of first and second measurements f1, f2 corresponding to said point, said predetermined function giving increasing weight to the first measurement f1 compared with the second measurement f2 while a first estimate fe of the ionizing radiation flux increases, which first estimate is a function of at least one of the first and second measurements f1 and f2, and said intensity at each point of the image being different from the first and second measurements f1 and f2, at least in a predetermined range of values of said first estimate fe of the ionizing radiation flux.

2. A method according to claim 1, in which the intensity value is a function solely of the ionizing radiation flux measurements corresponding to a given point of the observation zone.

3. A method according to claim 2, in which the intensity value of said image point is a function of a flux value f of the ionizing radiation as determined by the following formula:

$$f=\lambda\cdot[\alpha\cdot f1+(1-\alpha)\cdot f2]$$

where λ is a predetermined constant coefficient and α is an increasing function in the range 0 to 1 of said first estimate of the flux f.

4. A method according to claim 3, in which α is a continuous function of fe.

5. A method according to claim 4, in which α is a Boltzman sigmoid having the following formula:

$$\alpha=1-1/[1+\exp([fe-f0]/\Delta f)]$$

where f0 and Δf are two predetermined values referred to respectively as the transition value and as the transition width.

6. A method according to claim 1, in which fe is equal to f1.

7. A method according to claim 1, in which the image comprises a plurality of points each given an intensity value which is a function of a plurality of pairs of ionizing radiation flux measurements corresponding respectively to a plurality of adjacent points in the observation zone.

8. A method according to claim 7, in which the intensity value of each image point is a function:

firstly of ionizing radiation flux measurements corresponding to a given point of the observation zone; and secondly of first and second gradient values corresponding respectively to the first and the second measurements in the vicinity of the said point of the observation zone.

9. Imaging apparatus using ionizing radiation for implementing a method according to claim 1, the apparatus comprising:

at least one detection cell adapted to interact with ionizing radiation having energy lying within a predetermined range of energy values to generate a detection signal S(t) comprising a succession of individual detection signals s(t), the detection cell being adapted to generate an individual detection signal s(t) each time said detection cell detects an ionizing ray coming from a certain observation zone and having energy lying in a predetermined range of energy values; and processor means adapted to process the detection signal S(t) to obtain at least one ionizing radiation flux measurement detected by a given detection cell during a measurement period T so as to generate an image of the observation zone, said image comprising at least one point that is given a certain intensity value which is a function of at least said ionizing radiation flux as measured by the detection cell during the detection period, wherein the processor means comprise measuring means for making two measurements simultaneously of the ionizing radiation flux during each measurement period, namely:
a first measurement f1 proportional to the integral of the detection signal S(t) generated by the detection cell during the measurement period T; and
a second measurement f2 proportional to the number of successive detection signals s(t) generated by the detection cell during the measurement period T,
and wherein said processor means further comprise computer means for determining the intensity value of each point of the image as a predetermined function of at least one pair of first and second measurements f1 and f2 corresponding to said point, said predetermined function giving increasing weight to the first measurement f1 compared with the second measurement f2 when a first estimate fe of the ionizing radiation flux increases, which first estimate is a function of at least one of the first and second measurements f1 and f2, and said intensity value for each image point being different from the first and second measurements f1 and f2, at least in a predetermined range of values of said first estimate fe of the ionizing radiation flux.

* * * * *